(No Model.) 7 Sheets—Sheet 1.
G. J. W. GALSTER.
MACHINE FOR CUTTING CLOTH.
No. 353,552. Patented Nov. 30, 1886.
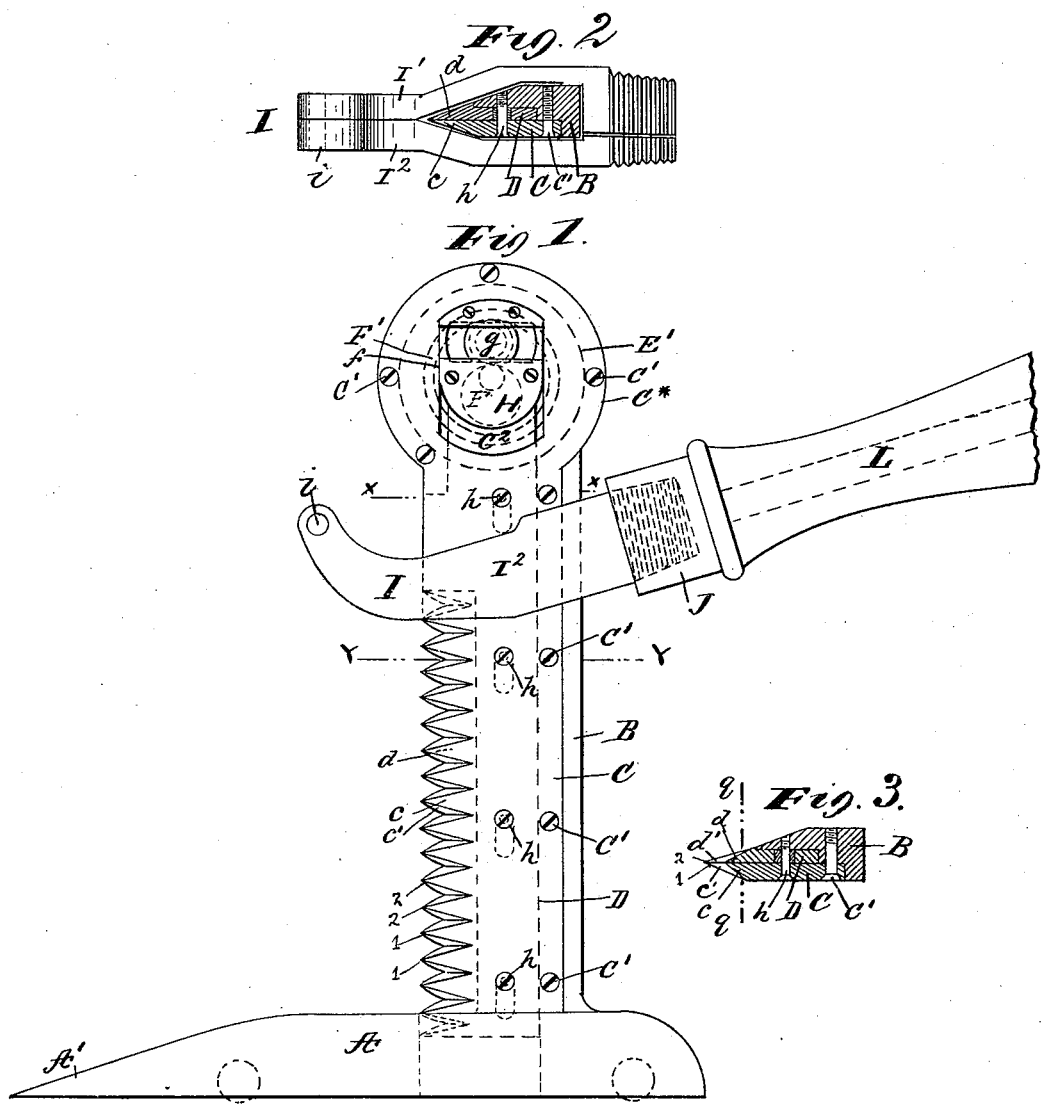
WITNESSES: 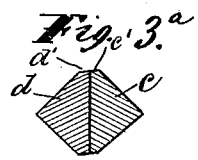 INVENTOR (No Model.)  7 Sheets—Sheet 2.
G. J. W. GALSTER.
MACHINE FOR CUTTING CLOTH.
No. 353,552.   Patented Nov. 30, 1886.
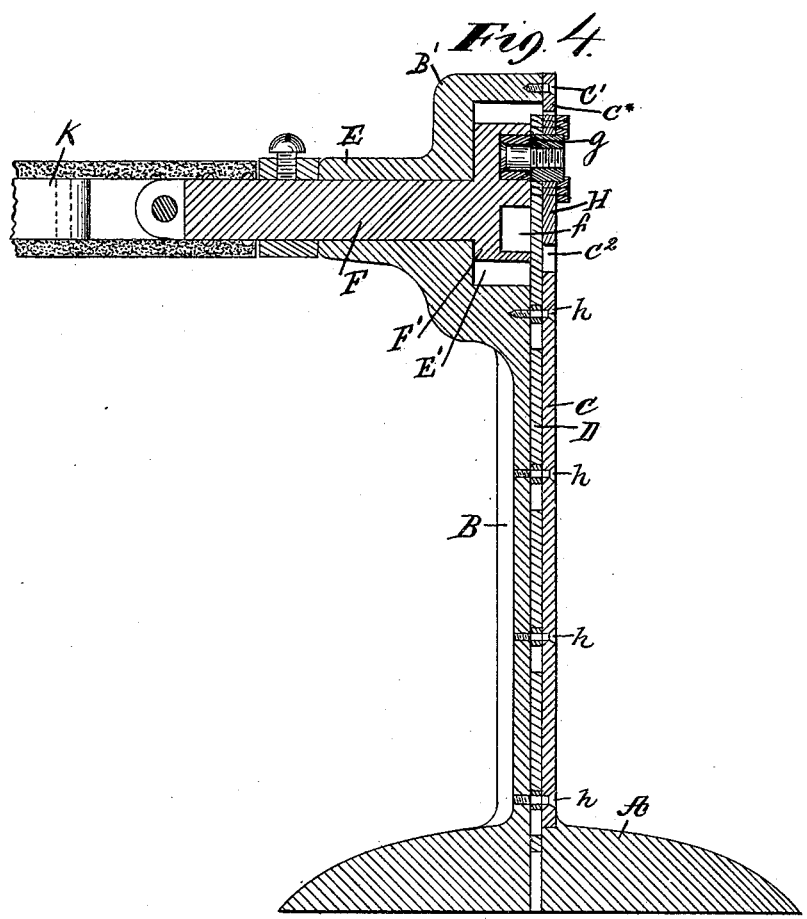
WITNESSES:   INVENTOR

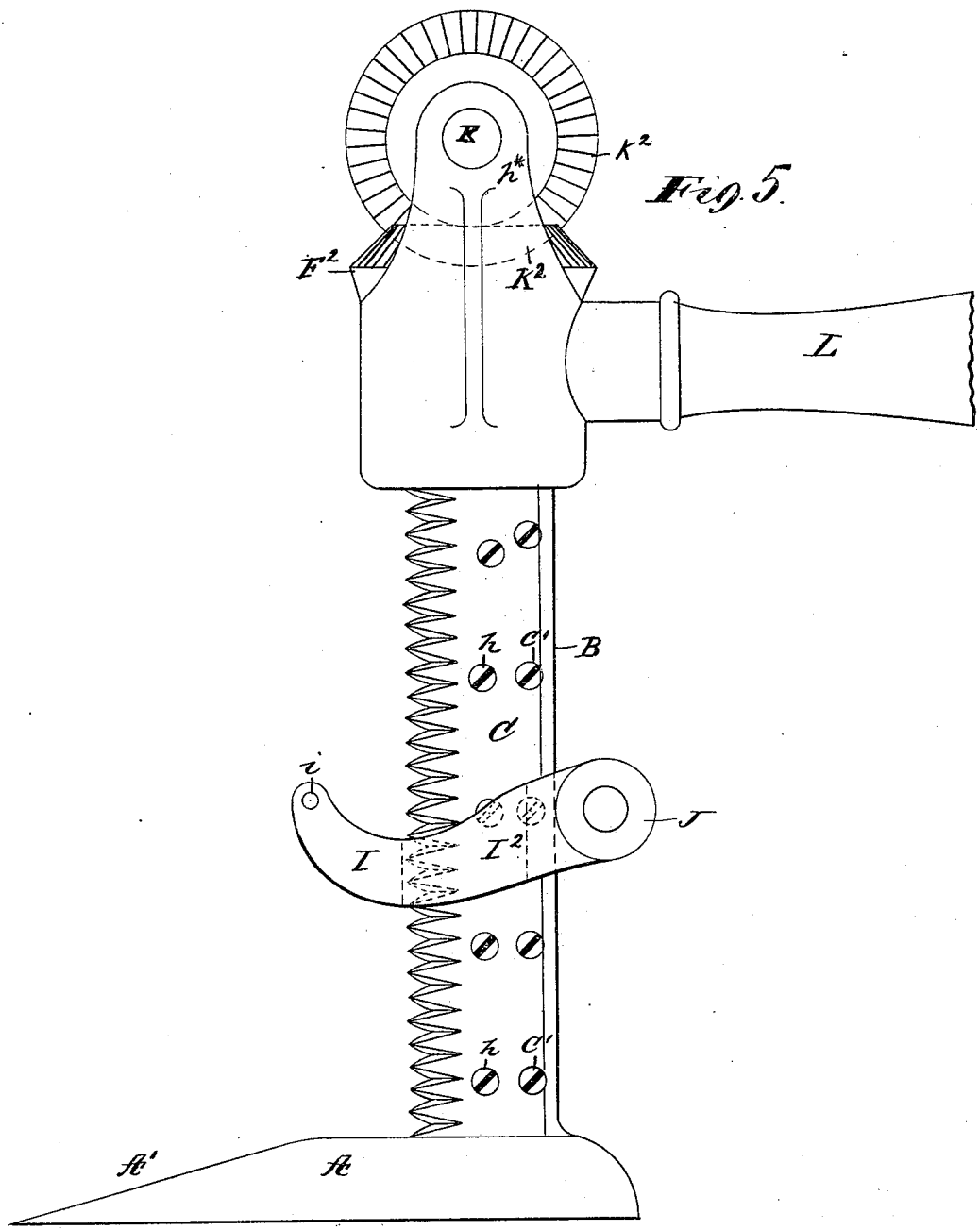

(No Model.) 7 Sheets—Sheet 4.
G. J. W. GALSTER.
MACHINE FOR CUTTING CLOTH.
No. 353,552. Patented Nov. 30, 1886.
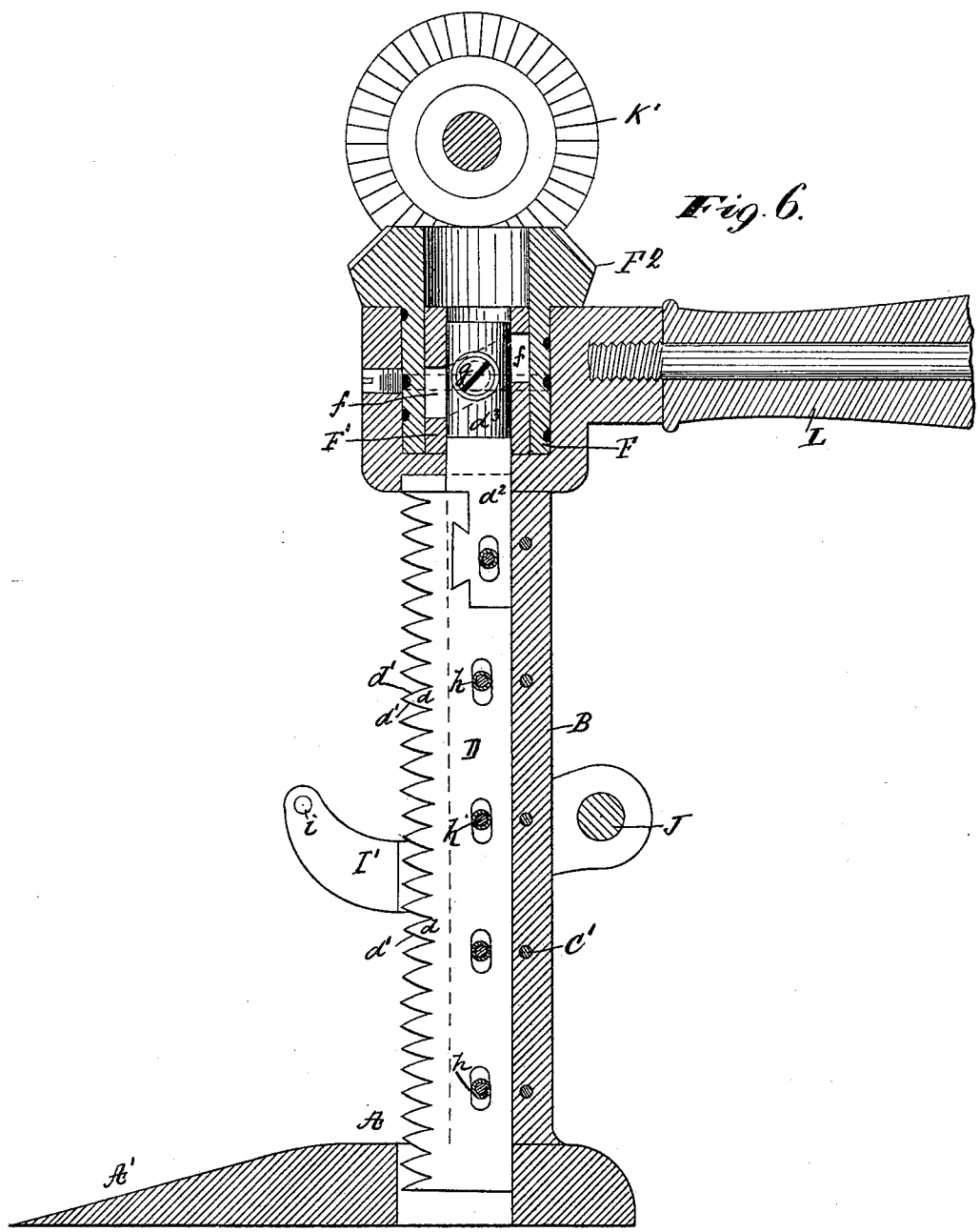
WITNESSES:
E. J. Griswold.
Wm. H. Capel
INVENTOR
Gabriel J. W. Galster

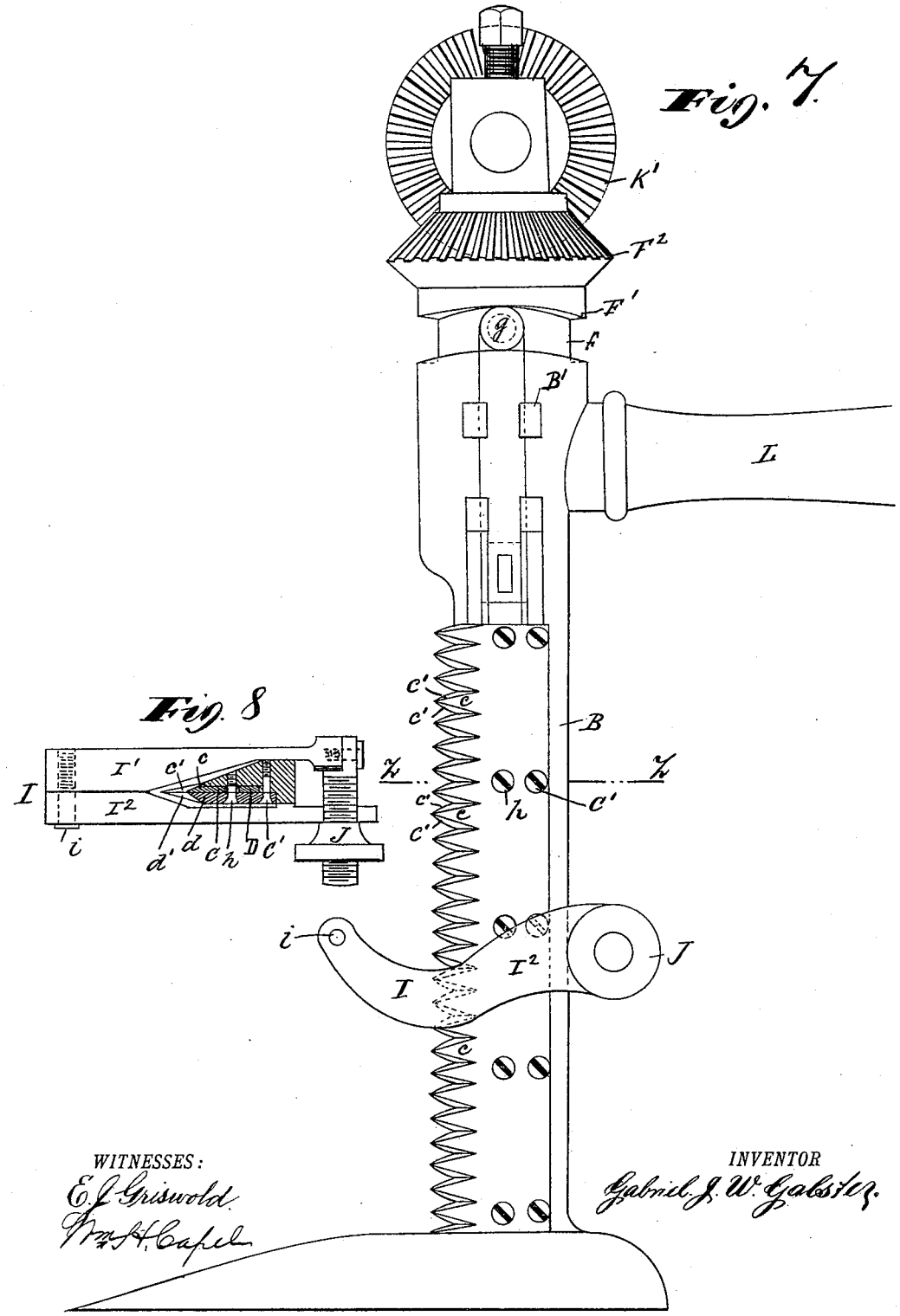

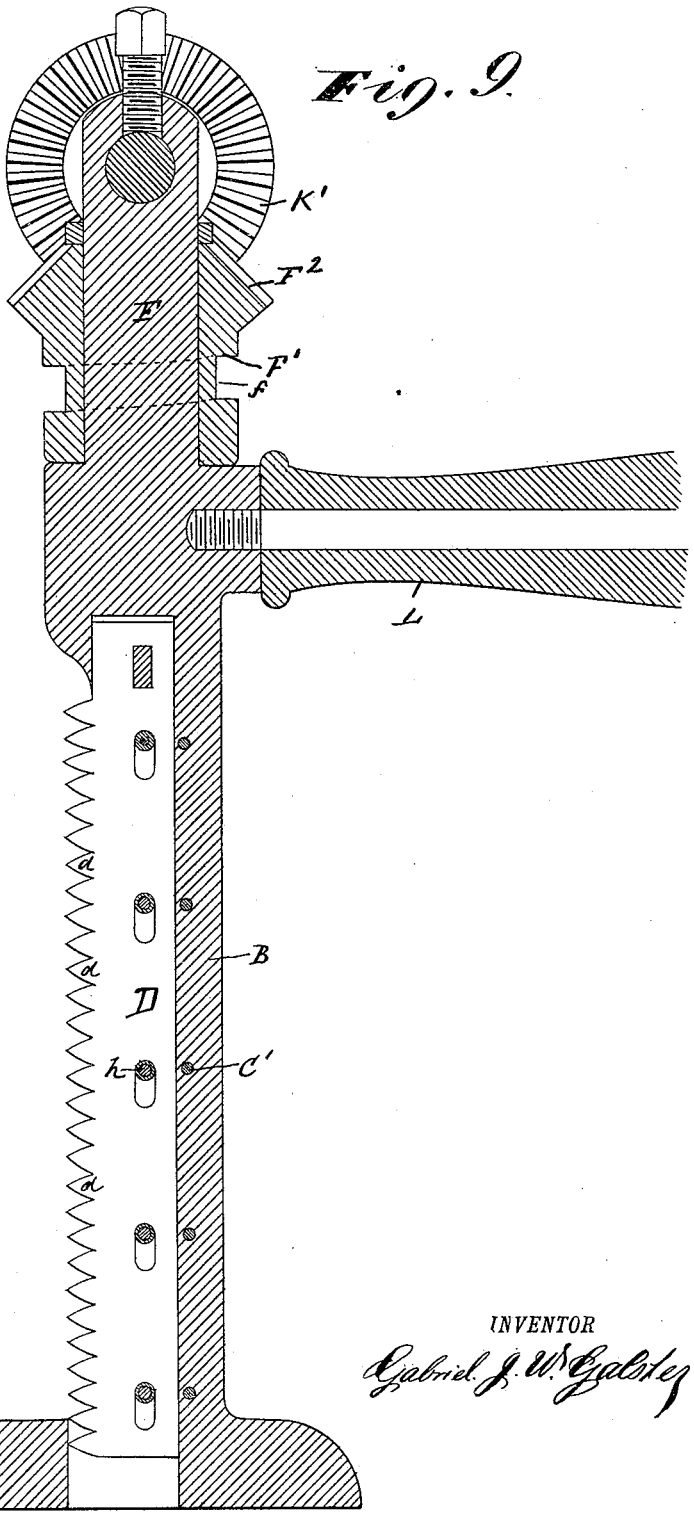

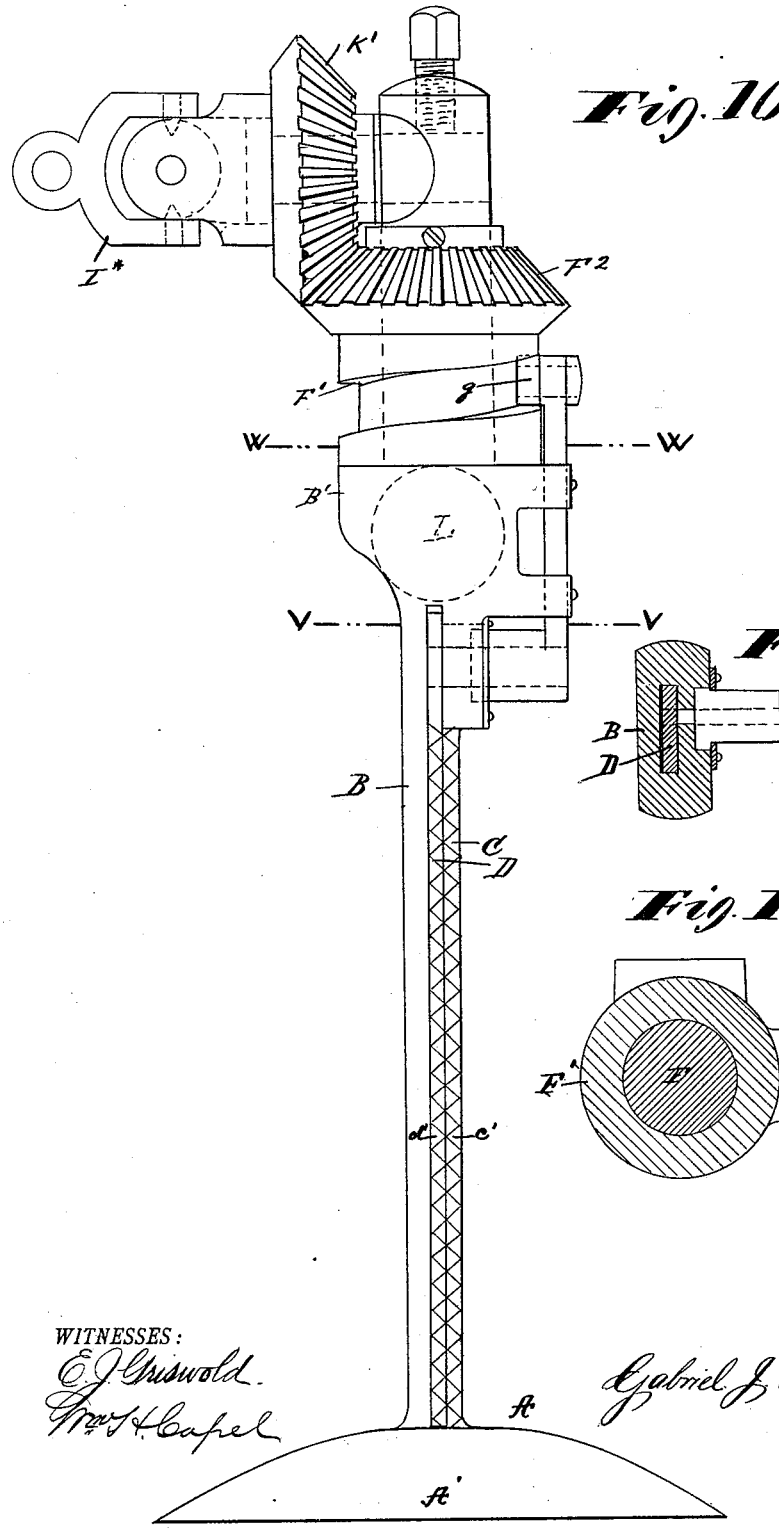

UNITED STATES PATENT OFFICE.

GABRIEL J. W. GALSTER, OF NEW YORK, N. Y.

MACHINE FOR CUTTING CLOTH.

SPECIFICATION forming part of Letters Patent No. 353,552, dated November 30, 1886.

Application filed July 7, 1886. Serial No. 207,320. (No model.)

*To all whom it may concern:*

Be it known that I, GABRIEL JOHAN WILHELM GALSTER, a subject of the King of Denmark, residing in New York city, in the county and State of New York, have invented a new and Improved Apparatus for Cutting Forms from a Layer or Layers of Fibrous or other Material, of which the following is a specification.

My present invention relates to an improved device for cutting forms or patterns from a layer or series of layers of fibrous or other material adapted to be made up into clothing, or other devices in which sections of a given form or configuration are essential to the perfection of the garment or article when the sections are united.

The accompanying drawings form part of this specification, and illustrate what I consider the best means of carrying out my invention.

Figure 1 is a side view of my improved device. Fig. 2 is a cross-section taken on the line X X of Fig. 1. Fig. 3 is a section taken on the line Y Y of Fig. 1. Fig. 3ª is a detail sectional view, enlarged, on line $q\ q$ of Fig. 3. Fig. 4 is a vertical cross-section of Fig. 1. Fig. 5 is a side view of a slight modification. Fig. 6 is a corresponding section of the same. Fig. 7 represents a side view of another slight modification. Fig. 8 is a cross-section taken on the line Z Z of Fig. 7. Fig. 9 is a vertical section of Fig. 7. Fig. 10 is an end view of Fig. 7. Fig. 11 is a cross-section on the line W W, Fig. 10; and Fig. 12 is a cross-section on the line V V, Fig. 10.

In each of the views similar letters of reference are employed to indicate corresponding parts wherever they occur.

According to my present invention, I arrange a bed-plate, A, having a tapering forward portion, A', adapted to pass under the layer or layers of material to be cut. To the upper side of the bed-plate is applied or affixed a vertical standard, B, adapted to support and control a fixed plate, C, formed with a series of duplex scissor-edges, $c$, and a vertically-traversing plate, D, provided with duplex scissor-edges $d$, adapted to act in conjunction with the duplex scissor-edges of the plate C. The projections $c$ and $d$ of the plates or cutters C D are further provided with the points 1 1 and 2 2, respectively, terminating on the same vertical line, so that when the machine is fed up to a solid mass of material the two cutters will engage the material at the same time. A distinguishing characteristic of my improved cutters, growing out of the use of the same in connection with a solid mass of material to be cut, is the sharpening of the points 2 2 of the reciprocating cutter D. The points are constructed of suitable size, shape, and material to form sharp cutting-points adapted to sever the cloth or other material by a straight knife-cut, as distinguished from the shear-cutting of the material by the meeting scissor-edges of the cutters. This "straight cutting," as I term it, by the points of the reciprocating cutter takes place during the upward and downward traverse of the cutter, in a manner that will be presently explained. The stationary cutter is not provided with sharpened cutting-points, as it only cuts by means of its scissor-edges as they co-operate with the corresponding scissor-edges of the movable cutter. It is evident, however, that it would be clearly within the spirit of my invention to make both cutters reciprocating, in which case both cutters would be provided with cutting-points to sever the material before it enters the interstices between the scissor-edges.

The standard B at its upper end is provided with a horizontal bearing, E, adapted to receive a shaft, F, and also with an enlargement, B', having a circular cam-recess, E', in which revolves cam F', provided with a course, $f$, in which is received an anti-friction roller, $g$, or other suitable device adapted to follow the course $f$ of the eccentric F' and operate the traversing plate D, as hereinafter explained. The anti-friction roller $g$ is pivoted on a pin affixed to the vertically-traversing plate D. The standard B, as fully shown by the drawings, is provided with a free passage-way for the traversing plate D, and also with full coincident accommodation for the fixed plate C. The plates C and D are held in correct relation by means of set-screws $h\ h$. The set-screws $h\ h$ pass through slots in the traversing plate D, and are secured firmly in the plate C and the standard B. The fixed plate C is secured in position by set-screws C', passing in the rear of the traversing plate D, and secured in the standard B.

The layers of fabric to be cut from time to time are held in position upon the bed-plate A by means of a presser-foot, I, which is formed in two parts, I' I², adapted to embrace the standard B at any desired height, while at the same time it allows of the free passage of the cutting-blades. The two parts I' I² of the clamp I are held together with any desired degree of tension by means of a clamping device, J, which, in the arrangement shown, is provided with a female screw adapted to engage with a male screw formed on the parts I' I² of the clamp I. The two parts I' I² of the presser-foot I, in the arrangement shown, are connected together in the front by a cross-pin, $i$; but in some cases I propose to employ a hinge or other suitable joint in place of the pin $i$.

When it is desired to cut a series of layers of cloth, the two halves I' I² of the presser-foot I are allowed to expand by the withdrawal of the binding-screw J. The presser-foot I can then be raised or lowered to the desired extent previous to starting the cutting device.

Motion is communicated to the shaft F by means of a flexible revolving shaft, K, as shown by Fig. 4, or any other suitable motive power. The presser-foot I in Figs. 1 to 4, inclusive, is shown provided with a directing and guiding handle, L. The fixed plate C at its upper end is formed with an enlarged head, C*, which forms the inclosing-plate for the recess E', in which revolves the cam F'. In the arrangement shown by Figs. 1 and 4 the enlarged head C* is provided with a central vertical slot, C², for the reception of guide H, which carries the roller working in the cam F'.

In Fig. 1 I have shown by dotted lines rollers for the support of the device.

The operation of the device is as follows: When it is desired to cut up a layer or series of layers of fabric or material, the device is pressed forward by the handle L, so that the tapering forward portion, A', of the bed-plate A shall come under the material to be cut. This being done, the presser-foot I is brought into position to press slightly upon the upper surface of the material to be cut. After the clamp has been placed in position motion is imparted to the shaft F, and thence, by means of the cam F', to the vertically-traversing plate D.

The device may be guided as desired by means of the handle L, so as to cut any desired pattern.

In Fig. 5 I have shown a slight modification of my device. In this case the handle L is not connected to the presser-foot I, but is attached directly to the vertical standard B. The binding-screw J in this case is independent of the handle L, and in place of being passed over the ends of the sections I' I² it passes through the section I², and its shank is tapped to take into a female screw in the section I'. The shaft F in this modification is arranged to operate vertically instead of horizontally, and the cam F' is affixed on the periphery of the shaft F, instead of at the end thereof. The standard B is extended vertically, and is provided with bearings $h^*$ for the support of a driving-shaft, K, which is provided with a bevel-wheel, K', which gears into another bevel-wheel, F², affixed on the end of the short hollow shaft F. In other respects the operation of the device is similar to that described in relation to the previous figures.

The traversing plate D is operated by a subsidiary plate, $d^2$, to the upper end of which is attached an extension, $d^3$, to which is connected the shaft of the anti-friction roller $g$, which works in the groove $f$ of the cam F' and vibrates the traversing plate D.

Figs. 7, 8, 9, and 10 show another slight modification of the construction of the improved cutter. In this modification the cam F' is arranged on the extension of a shank connected to or forming part of the bevel-wheel F², which is supported by and revolves upon the extension B' of the standard B, which is provided with bearings for the bevel-wheel K', which in this case is driven by a universal joint, I*, which is operated by a flexible shaft.

In each of the modifications the construction and operation of the blades C D are identical.

The cutting-points, being arranged, as described, on the same vertical line, are presented to the edge of the pile of cloth or fabric to be cut, and when in that position the sharp cutting-points of the moving cutter sever the material by a straight cut for a portion of their movement, in the same manner as the teeth of a crosscut-saw, or with the same effect as though the point of a knife-blade were carried down past and in contact with the fabric. As the cutter approaches the end of its traverse the material entering the interstices between the cutters is severed by the meeting faces of the scissor-edges $c'$ $c'$ $d'$ $d'$. The points of the stationary cutter enter the material to be cut for a slight distance, and hold the same against the upward and downward pull of the movable cutters. A partial cut is effected both on the upward and downward motion of the plate $c$. The blades C D are so constructed as to present little resistance to the passage of the device through the fabric, and the fabric when cut is readily freed from the cutting-edges.

By my peculiar construction of the cutting-edges of the plates C D, I am enabled to insure a perfectly clean and direct vertical cut, and in addition I avoid the drag on the fabric which is common to all other cutters.

Having thus described my invention, what I claim as new therein, and desire to secure by Letters Patent, is—

1. In a machine for cutting forms, a cutter composed of two blades or plates moving one upon the other, and each provided with a series of duplex scissor-edges and terminating in cutting-points, said points on both blades extending to the same vertical line, whereby the blades are adapted to cut their way into a solid mass of material.

2. The combination, with the traversing bed-plate and standard of a machine for cutting forms from a layer or layers of fibrous or other material, of a fixed blade and a vertically-reciprocating blade, each blade having inclined duplex scissor-edges, and the reciprocating blade being provided with sharp cutting-points, whereby the blades are adapted to cut their way into a solid mass of material, as and for the purpose described.

3. In an apparatus for cutting forms, a traversing bed-plate, two blades projecting up at right angles from the plane of said bed-plate and provided with duplex scissor-edges terminating in points which extend to the same vertical plane, the points of one blade being sharpened, as described, and means for giving to said latter blade a vertically-reciprocating movement, as and for the purpose described.

4. In an apparatus for cutting forms, the combination of a traversing bed-plate, a blade or plate projecting upward from the bed-plate at right angles to the plane thereof and formed with a series of duplex scissor-edges terminating in points, a second blade similarly formed with sharpened points, as described, flush with the points of the first blade and working in suitable guides carried by the bed-plate, a flexible shaft, and intermediate mechanism for imparting a reciprocating movement to the second cutter-blade, as and for the purpose described.

5. In an apparatus for cutting forms, a cutter composed of a fixed blade provided with a series of duplex scissor-edges terminating in points, and a vertically-reciprocating blade provided with corresponding duplex scissor-edges terminating in sharp cutting-points, the points of the stationary and reciprocating blade being arranged on the same vertical line, whereby the blades are adapted to cut their way into a solid mass of material, as and for the purpose described.

6. The combination, with the bed-plate and standard of an apparatus for cutting forms, of two vertical blades moving one upon the other, and a two-part adjustable presser-foot surrounding said blades and standard, and means for clamping the same to the standard, as and for the purpose described.

Signed at New York, in the county of New York and State of New York, this 3d day of July, A. D. 1886.

GABRIEL J. W. GALSTER.

Witnesses:
WM. H. CAPEL,
WM. H. BLAIN.